US00RE38151E

(19) United States
(12) Reissued Patent
Penkunas et al.

(10) Patent Number: US RE38,151 E
(45) **Date of Reissued Patent: *Jun. 24, 2003**

(54) ROTATABLE CUTTING BIT

(75) Inventors: Joe Penkunas, Wake Forest, NC (US); Neil Portnoff, Towanda, PA (US)

(73) Assignee: Kennametal Inc., Latrobe, PA (US)

( * ) Notice: This patent is subject to a terminal disclaimer.

(21) Appl. No.: 09/933,234

(22) Filed: Aug. 20, 2001

Related U.S. Patent Documents

Reissue of:
(64) Patent No.: 4,865,392
Issued: Sep. 12, 1989
Appl. No.: 07/074,210
Filed: Jul. 16, 1987

U.S. Applications:
(63) Continuation of application No. 06/756,210, filed on Jul. 18, 1985, now Pat. No. 4,725,099.

(51) Int. Cl.[7] ..... E21C 35/18
(52) U.S. Cl. ..... 299/111; 175/426
(58) Field of Search ..... 299/111, 113, 299/110, 79.1; 175/426, 428

(56) References Cited

U.S. PATENT DOCUMENTS

| | | | | |
|---|---|---|---|---|
| 2,847,921 | A | 8/1958 | Heckathorn | 172/699 |
| 3,268,259 | A | 8/1966 | Snipe | 299/111 |
| 3,356,418 | A | 12/1967 | Henley et al. | 299/113 |
| 3,397,012 | A | 8/1968 | Krekeler | 299/104 |
| 3,498,677 | A | 3/1970 | Morrow | 299/102 |
| 3,519,309 | A | 7/1970 | Engle et al. | 299/107 |
| 3,663,063 | A | 5/1972 | Johnmeyer et al. | 299/107 |
| 3,796,464 | A | 3/1974 | Hansen et al. | 299/104 |

(List continued on next page.)

FOREIGN PATENT DOCUMENTS

| | | |
|---|---|---|
| DE | 1275499 | 4/1969 |
| DE | 2442146 | 3/1976 |
| DE | 2644992 | 4/1978 |
| DE | 2820642 | 11/1978 |
| DE | 2821673 | 4/1980 |
| DE | 2846744 | 4/1980 |
| FR | 1350451 | 3/1963 |
| GB | 1110495 | 4/1968 |
| GB | 1112446 | 5/1968 |
| GB | 1294717 | 11/1972 |
| GB | 2041289 | 9/1980 |
| GB | 1601470 | 10/1981 |
| SU | 316835 | 10/1971 |
| SU | 468994 | 7/1975 |
| SU | 646047 | 2/1979 |
| SU | 899916 | 1/1982 |

OTHER PUBLICATIONS

American Mine Tool Drawing T104 23 (Mar. 29, 1983) Long Rock Tip.
Kennametal Catalog for "Carbide Tools" (1980) B80–43 (10) LO.

(List continued on next page.)

*Primary Examiner*—Heather Shackelford
*Assistant Examiner*—John Kreck
(74) *Attorney, Agent, or Firm*—Kevin P. Weldon

(57) ABSTRACT

A rotatable cutting insert of improved geometry having a shank depending from a head portion and having a hard insert mounted therein, includes an insert having a conically shaped tip section, a base section contiguous with a first intermediate section, a second intermediate section contiguous with both tip and first intermediate section, and where the diameter of the second intermediate section is equal to the maximum diameter of the tip but is smaller than the diameter of the base section.

56 Claims, 1 Drawing Sheet

U.S. PATENT DOCUMENTS

| | | | | |
|---|---|---|---|---|
| 3,807,804 | A | 4/1974 | Kniff | 299/113 |
| 3,830,321 | A | 8/1974 | McKenry et al. | 175/332 |
| 3,997,011 | A | 12/1976 | Staroba | 175/400 |
| 4,065,185 | A | 12/1977 | Elders | 299/110 |
| 4,084,856 | A | 4/1978 | Emmerich et al. | 299/104 |
| 4,149,753 | A | 4/1979 | Stoltz et al. | 299/107 |
| 4,163,581 | A | 8/1979 | Krekeler | 299/102 |
| 4,201,421 | A | 5/1980 | Den Besten et al. | 299/107 |
| 4,216,832 | A | 8/1980 | Stephenson et al. | 175/540 |
| 4,333,687 | A | 6/1982 | Barnstorf | 299/81.2 |
| 4,484,783 | A | 11/1984 | Emmerich | 299/107 |
| 4,497,520 | A | 2/1985 | Ojanen | 299/111 |
| 4,542,943 | A | 9/1985 | Montgomery, Jr. et al. | 299/102 |
| 4,547,020 | A | 10/1985 | Ojanen | 299/111 |
| 4,561,698 | A | 12/1985 | Beebe | 299/104 |
| 4,582,364 | A | 4/1986 | deMey, III | 299/111 |
| 4,938,538 | A | 7/1990 | Larsson et al. | 299/111 |
| 5,161,859 | A | 11/1992 | Larsson et al. | 299/111 |

OTHER PUBLICATIONS

General Electric Drawing for CCT–765–CB Tip (Mar. 27, 1979).

Multi–Metals Drawing C–14455–7 (Sep. 5, 1973).

American Mine Tool "Competitive Evaluation Report" (Jun. 29, 1982) by R.W. Ojanen.

"Rock cutting experiments with point attack tools," Collier Guardian Coal International Apr. 1980 Pp. 47, 49–50.

Mining Journal, Apr. 2, 1965 "Cap Tip For Picks".

Advertisement for Mining Supplies Ltd in Colliery Guardian, Oct. 4, 1962.

American Mine Tool Drawing T–104–13 (Nov. 30, 1982).

American Mine Tool Drawing AM722M (Oct. 13, 1982).

American Mine Tool Drawing SC–12 (May 8, 1982).

ROTATABLE CUTTING BIT

Matter enclosed in heavy brackets [ ] appears in the original patent but forms no part of this reissue specification; matter printed in italics indicates the additions made by reissue.

This is a continuation of co-pending application serial no. 756,210 filed on 7/18/85 now U.S. Pat. No. 4,725,099.

FIELD OF INVENTION

The present invention relates to a rotatable cutting bit of the type having an improved head portion and depending shank.

BACKGROUND OF INVENTION

Bits that are used in mining and for removing road surfaces are typically mounted in a machine having a power driven cutting wheel.

When employed on abusive material such as concrete, the attack bits encounter high pressures and undergo excessive steel wear around the tip section. Currently employed conically shaped tips not only experience degrees of blunting, thereby reducing machines speed, but also suffer from the presence of manufacturing flaws which can lead to total bit failure.

One example of commercially successful bits is described in U.S. Pat. No. 4,497,520, issued on Feb. 5, 1985 to Ojanen and assigned to the same assignee as the present invention. The patent discloses and claims a rotatable cutting bit where the head portion consists of a base section, a conical tip section with a maximum diameter, and an intermediate section contiguous with the base and tip sections. Under manufacturing conditions the dies used in forming these bits experience wear at the point of maximum tip diameter (the seam) resulting in unwanted accumulation of uncompressed carbide material (flashing). Commonly known methods of polishing, such as mechanical tumbling, remove the flashing but generate stress cracks along the same thereby increasing the likelihood of bit failure.

As a consequence of the commercial success of assignees Patent No. 4,497,520, consideration has now been given to improvements in construction relative to methods of manufacture for such tooling for better quality and control in production volumes.

SUMMARY OF THE INVENTION

In accordance with the present invention there is provided, a rotatable cutting bit comprising a head portion, a shank portion depending from said head portion along a longitudinal axis, said head portion having a socket at the forward end, a hard insert having coaxially aligned and integral sections, said sections comprising a base section, a tip section, a first intermediate section contiguous with said base, a second intermediate section of uniform diameter contiguous with said first intermediate and tip sections, said base being fixedly mounted in said socket and having a first diameter, said tip section being conically shaped and having a maximum second diameter, said first intermediate section having a maximum third diameter, said second intermediate section having a fourth diameter equal to said second diameter, said second and third diameters each being less than said first diameter, said first intermediate section at said base forming a fillet at the junction thereof whereby said base forms a shoulder with said first intermediate section.

The present invention alleviates the disadvantages of premature blunting and the formation of manufacturing flaws by providing a small diameter tip and by providing an adjoining cylindrical intermediate section. In production, the tip end plunger completes its compression stroke on a vertical section of the die rather than on the angular seam section of the prior art, thereby reducing die wear and the associated problems of flashing accumulation and stress crack formation.

DRAWINGS

DETAILED DESCRIPTION

Figure 1:
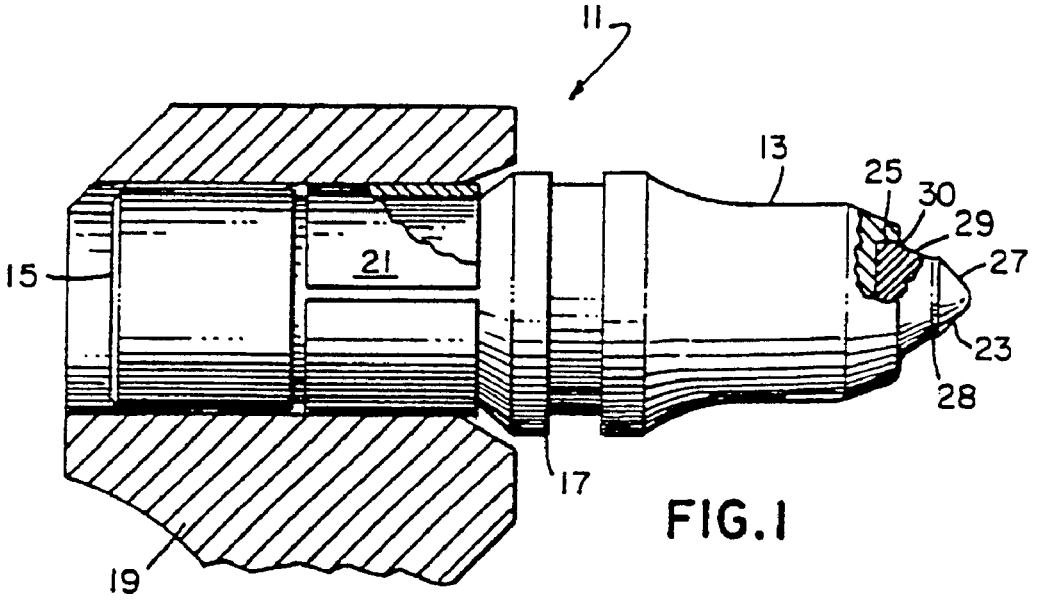
FIG. 1 is a partially sectioned view of a bit mounted in block.

Referring to the drawings, FIG. 1 shows a rotatable bit 11 having a head portion 13 and a depending shank portion 15. The head portion 13 and shank 15 are coaxially aligned with the head 13 having an enlarged section 17 which prevents the head 13 from being forced into the opening in the mounting block 19. The shank portion 15 which is a cylindrical configuration includes a sleeve 21 which is radially contracted when present in the opening so as to hold the bit 11 in the block 19.

A hard insert 23 typically made of a carbide material is fixedly secured to the forward end of the head 13. Preferably the base section 25 of the insert 23 is positioned in the socket and brazed in such a manner that the braze flows over and around the base section 25.

In accordance with the principals of the present invention, the insert 23 includes a plurality of sections coaxially aligned with the head 13 and shank 15 of the bit 11. The sections include a base section 25, a tip section 27, a first intermediate section 29 contiguous to both the base 25 and a second intermediate section 28, and a tip section 27 contiguous with the second intermediate section 28.

The tip section 27 tapers outwardly at an included angle "c" of from about 83 degrees to about 93 degrees. Preferably the angle is about 88 degrees. The point portion of the tip may be rounded to promote even wearing. Preferably the tip 27 extends downwardly in an axial direction toward the base 25 a distance of from about 0.12 to about 0.18 inches. The maximum diameter of the tip 27 is from about 0.36 to about 0.44 inches, and most preferably about 0.40 inches.

The second intermediate section 28 extends downwardly from the junction with tip 27 or forwardly from the junction with the first intermediate section 29 along a longitudinal direction a distance of about 0.02 to about 0.05 inches and most preferably about 0.03 inches. The second intermediate section 28 is cylindrical in shape and exhibits a uniform diameter equal to the maximum diameter of the tip 27.

The first intermediate section 29 extends downwardly from the juncture with the second intermediate section 28 or forwardly from the juncture with the base 25 along a longitudinal direction a distance of about 0.22 to about 0.28 inches. Preferably the first intermediate section 29 has a frusto-conical shape and tapers outwardly to the base section 25 at an included angle "d" of from about 17 to about 23 degrees. The taper is outwardly from the junction with the second intermediate section 28 to the junction with the base 25. The first intermediate section 29 has a maximum diameter less than the diameter of the base 25.

Figure 4:
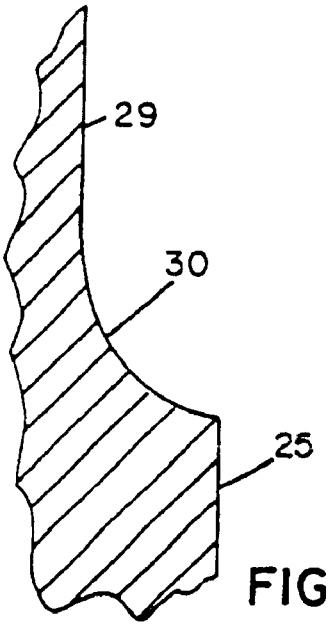
FIG. 4 is a cut-out side view of the fillet section joining the first intermediate section and the base section.
Figure 3:
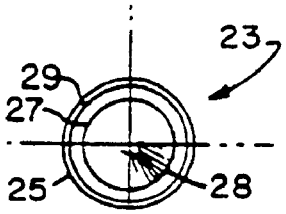
FIG. 3 is an end view of a tip.
Figure 2:
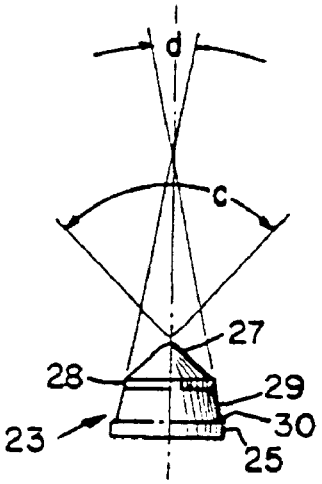
FIG. 2 is a side view of a tip.

The base section 25 preferably has a diameter of from about 0.60 to about 0.66 and most preferably about 0.63. The extension of the base 25 in the axial direction or the height of the base is from about 0.05 to about 0.11 inches preferably about 0.08. As illustrated in FIG. 3 and FIG. 4, a fillet 30 may be utilized to give a smooth transition from the base 25 to the first intermediate section 29 whereby the base 25 forms a shoulder with the first intermediate section 29. The transition is in the form of an arc of radius between about 0.15 inches and about 0.25 inches which sweeps out a distance starting from the base section 25 forwardly to a diameter in the first intermediate section 24 of between about 0.54 to about 0.60 inches and preferably about 0.60. A more severe transition between the first intermediate section 29 and the base 25 often results in the formation of stress cracks along the fillet thereby increasing the likelihood of bit failure.

*The total axial length of the hard insert is the sum of the axial lengths of the tip section (0.12 inches to 0.18 inches), the second intermediate section (0.02 inches to 0.05 inches) (which is a fifth distance), the first intermediate section (0.22 inches to 0.28 inches), and the base section (0.05 inches to 0.11 inches). It can this be seen that the axial length of the hard insert, which is a sixth distance, can range between 0.41 inches to 0.62 inches. Using the preferred dimensions, the axial length ranges between about 0.45 inches and about 0.57 inches.*

*The ratio of the fifth distance, which is the axial length of the second intermediate section, to the first diameter of the base section ranges between about 0.03 and about 0.08. Based upon the preferred dimensions, this ratio of the fifth distance to the first diameter equals about 0.05.*

*The ratio of the fifth distance (the axial length of the second intermediate section) to the sixth distance (the overall axial length of the hard insert) has a range between a minimum ratio and a maximum ratio. The minimum ratio is the ratio of the minimum fifth distance (i.e., 0.02 inches) to the maximum sixth distance that uses the minimum fifth distance. This sixth distance (i.e., 0.59 inches) used to arrive at the minimum ratio equals the sum of the maximum axial length of the tip section (0.18 inches), the minimum axial length of the second intermediate section (0.02 inches), the maximum axial length of the first intermediate section (0.28 inches), and the maximum axial length of the base section (0.11 inches). This minimum ratio equals about (0.02/0.59) 0.03. The maximum ratio is the ratio of the maximum fifth distance to the minimum sixth distance that uses the maximum fifth distance. The sixth distance equals the sum of the minimum axial lengths of the tip section (0.12 inches), the first intermediate section (0.22 inches), and the base section (0.05 inches), and the maximum fifth distance (0.05 inches). This maximum ratio equals about (0.05/0.44) 0.11. Based upon the preferred dimensions to the extent they are set forth, the preferred ratio of the fifth distance to the sixth distance ranges between about (0.03/0.57) 0.05 and about (0.03/0.45) 0.07.*

Since variations of this invention will be apparent to those skilled in the art, it is intended that this invention be limited only by the scope of the appended claims.

I claim:

1. A rotatable cutting bit comprising a head portion, a shank portion depending from said head portion along a longitudinal axis, said head portion having a socket at the forward end, a hard insert having coaxially aligned and integral sections, said sections comprising a base section, a tip section, a first intermediate section contiguous with said base, a second intermediate section of uniform diameter contiguous with said first intermediate and tip sections, *said second intermediate section extends forwardly along the longitudinal axis from the junction with the first intermediate section to the tip section a distance of about 0.02 to about 0.05 inches,* said base being fixedly mounted in said socket and having a first diameter, said tip section being conically shaped and having a maximum second diameter, said first intermediate section having a maximum third diameter, said second intermediate section having a fourth diameter equal to said maximum second diameter, said second and third diameters each being less than said first diameter, said first intermediate section has a frusto-conical shape and angles outwardly from the junction with said second intermediate section to the junction with said base section, said first intermediate section at said base forming a fillet at the junction thereof whereby said base forms a shoulder with said first intermediate section said insert is fixedly held to said head portion by brazing.

2. A rotatable cutting bit according to claim 1 wherein said tip section tapers outwardly at an included angle of from about 83 degrees to about 93 degrees.

3. A rotatable cutting bit according to claim 2 wherein said first intermediate section extends forwardly along the longitudinal axis from said base section to said second intermediate section a distance of from about 0.22 to about 0.28 inches.

4. A rotatable cutting bit according to claim 3 wherein said second intermediate section has a cylindrical shape [and extends forwardly along the longitudinal axis from the junction with said first intermediate section to the tip section a distance of about 0.02 to about 0.05 inches].

5. A rotatable cutting bit according to claim 4 wherein said base section extends forwardly along the longitudinal axis a distance of from about 0.05 to about 0.11 inches.

6. A rotatable cutting bit according to claim 5 wherein said first diameter is from about 0.60 to about 0.66 inches.

7. A rotatable cutting bit according to claim 6 wherein said second diameter is from about 0.36 to about 0.44 inches.

8. A rotatable cutting bit comprising a head portion, a shank portion depending from said head portion along a longitudinal axis, said head portion having a socket at the forward end, a hard insert having coaxially aligned and integral sections, said sections comprising a base section, a tip section, a first intermediate section contiguous with said base, substantially all of said first intermediate section projects forwardly of the forward end of said head portion, a second intermediate section of uniform diameter contiguous with said first intermediate and tip sections, *said second intermediate section extends forwardly along the longitudinal axis from the junction with the first intermediate section to the tip section a distance of about 0.02 to about 0.05 inches,* said base being fixedly mounted in said socket and having a first diameter, said tip section being conically shaped and having a maximum second diameter, said first intermediate section having a maximum third diameter, said second intermediate section having a fourth diameter equal to said maximum second diameter, said second and third diameters each being less than said first diameter, said first intermediate section has a frusto-conical shape and angles outwardly from the junction with said second intermediate section to the junction with said base section, said first intermediate section at said base forming a fillet at the junction thereof whereby said base forms a shoulder with said first intermediate section said insert is fixedly held to said head portion by brazing.

9. A rotatable cutting bit comprising a head portion, a shank portion depending from said head portion along a longitudinal axis, said head portion having a socket at the forward end, a hard insert having coaxially aligned and integral sections, said sections comprising a base section, a tip section, a first intermediate section contiguous with said base, a second intermediate section of uniform diameter contiguous with said first intermediate and tip sections, *said second intermediate section extends forwardly along the longitudinal axis from the junction with the first intermediate section to the tip section a distance of about 0.02 to about 0.05 inches,* said base being fixedly mounted in said socket and having a first diameter, said tip section being conically shaped and having a maximum second diameter, said first intermediate section having a maximum third diameter, said second intermediate section having a fourth diameter equal to said maximum second diameter, said second and third diameters each being less than said first diameter, said first intermediate section has a frusto-conical shape and angles outwardly from the junction with said second intermediate section to the junction with said base section at an included angle of from about 17 to about 23 degrees, said first intermediate section at said base forming a fillet at the junction thereof whereby said base forms a shoulder with said first intermediate section said insert is fixedly held to said head portion by brazing.

10. A rotatable cutting bit comprising a head portion, a shank portion depending from said head portion along a longitudinal axis, said head portion having a socket at the forward end, a hard insert having coaxially aligned and integral sections, said sections comprising a base section, a tip section, a first intermediate section contiguous with said base, a second intermediate section of uniform diameter contiguous with said first intermediate and tip sections, *said second intermediate section extends forwardly along the longitudinal axis from the junction with the first intermediate section to the tip section a distance of about 0.02 to about 0.05 inches,* said base being fixedly mounted in said socket and having a first diameter, said tip section being conically shaped and having a maximum second diameter, said first intermediate section having a maximum third diameter, said second intermediate section having a fourth diameter equal to said maximum second diameter, said second and third diameters each being less than said first diameter, said first intermediate section has a frusto-conical shape and angles outwardly from the junction with said second intermediate section to the junction with said base section at an included angle of from about 17 to about 23 degrees, said first intermediate section at said base forming a fillet at the junction thereof whereby said base forms a shoulder with said first intermediate section said insert is fixedly held to said head potion by brazing, said braze flowing over and around said base section.

11. A rotatable cutting bit comprising a head portion, a shank portion depending from said head portion along a longitudinal axis, said head portion having a socket at the forward end, a hard insert having a coaxially aligned and integral sections, said [section] *sections* comprising a base section, a tip section, a first intermediate section contiguous with said base, a second intermediate section of uniform diameter contiguous with said first intermediate and tip sections, *said second intermediate section extends forwardly along the longitudinal axis from the junction with the first intermediate section to the tip section a distance of about 0.02 to about 0.05 inches,* said base being fixedly mounted in said socket and having a first diameter of from about 0.60 to about 0.66 inches, said tip section having a maximum second diameter being from about 0.35 to about 0.44 inches and being conically shaped with an included angle from about 83 degrees to about 93 degrees, said first intermediate section having a maximum third diameter, said second intermediate section having a maximum fourth diameter equal to said maximum second diameter, said second and third diameters each being less than said first diameter, said first intermediate section has a frusto-conical shape angling outwardly from the junction with said second intermediate section to the junction with said base section at an included angle of about 17 to about 23 degrees, said first intermediate section and said base forming a fillet at the junction thereof whereby said base forms a shoulder with said intermediate section, said insert is fixedly held to said head portion by brazing.

12. A rotatable cutting bit according to claim 11 wherein said first intermediate section extends forwardly along the longitudinal axis from said base section to said second intermediate section a distance of about 0.22 to about 0.28 inches.

[13. A rotatable bit according to claim 12 wherein said second intermediate section extends forwardly along the longitudinal axis from said first intermediate section to said second section a distance from about 0.02 to about 0.05 inches.]

14. A rotatable cutting bit according to claim [13] *12* wherein said base section extends forwardly along the longitudinal axis a distance of from about 0.05 to about 0.11 inches.

15. A rotatable cutting bit comprising a head portion, a shank portion depending from said head portion along a longitudinal axis, said head portion having a socket at the forward end, a hard insert having a coaxially aligned and integral sections, said [section] *sections* comprising a base section, a tip section, a first intermediate section contiguous with said base, a second intermediate section of uniform diameter contiguous with said first intermediate and tip sections, *said second intermediate section extends forwardly along the longitudinal axis from the junction with the first intermediate section to the tip section a distance of about 0.02 to about 0.05 inches,* said base being fixedly mounted in said socket and having a first diameter of from about 0.60 to about 0.66 inches, said tip section having a maximum second diameter being from about 0.36 to about 0.44 inches and being conically shaped with an included angle from about 83 degrees to about 93 degrees, said first intermediate section having a maximum third diameter, said second intermediate section having a maximum fourth diameter equal to said maximum second diameter, said second and third diameters each being less than said first diameter, said first intermediate section has a frusto-conical shape angling outwardly from the junction with said second intermediate section to the junction with said base section at an included angle of about 17 to about 23 degrees, said first intermediate section extends forwardly along the longitudinal axis from said base section to said second intermediate section a distance of about 0.22 to about 0.28 inches, said first intermediate section and said base forming a fillet at the junction thereof whereby said base forms a shoulder with said intermediate section, said insert is fixedly held to said head portion by brazing.

16. A rotatable cutting bit comprising a head portion, a shank portion depending from said head portion along a longitudinal axis, said head portion having a socket at the forward end, a hard insert having a coaxially aligned and integral sections, said [section] *sections* comprising a base section, a tip section, a first intermediate section contiguous with said base, a second intermediate section of uniform diameter contiguous with said first intermediate and tip sections, said base being fixedly mounted in said socket and having a first diameter of from about 0.60 to about 0.66 inches, said tip section having a maximum second diameter being from about 0.36 to about 0.44 inches and being conically shaped with an included angle from about 83 degrees to about 93 degrees, said first intermediate section having a maximum third diameter, said second intermediate section having a maximum fourth diameter equal to said maximum second diameter, said second and third diameters each being less than said first diameter, said first intermediate section has a frusto-conical shape angling outwardly from the junction with said second intermediate section to the junction with said base section at an included angle of about 17 to about 23 degrees, said first intermediate section and said base forming a fillet at the junction thereof whereby said base forms a shoulder with said intermediate section, said second intermediate section extending forwardly along the longitudinal axis from said first intermediate section to said second section a distance from about 0.02 to about 0.05 inches, said insert is fixedly held to said head portion by brazing.

17. A rotatable cutting bit comprising a head portion, a shank portion depending from said head portion along a longitudinal axis, said head portion having a socket at the forward end, a hard insert having a coaxially aligned and integral sections, said section comprising a base section, a tip section, a first intermediate section contiguous with said base, a second intermediate section of uniform diameter contiguous with said first intermediate and tip sections, *said second intermediate section extends forwardly along the longitudinal axis from the junction with the first intermediate section to the tip section a distance of about 0.02 to about 0.05 inches,* said base being fixedly mounted in said socket and having a first diameter of from about 0.60 to about 0.66 inches, said base section extends forwardly along the longitudinal axis a distance of from about 0.05 to about 0.11 inches, said tip section having a maximum second diameter being from about 0.36 to about 0.44 inches and being conically shaped with an included angle from about 83 degrees to about 93 degrees, said first intermediate section having a maximum third diameter, said second intermediate section having a maximum fourth diameter equal to said maximum second diameter, said second and third diameters each being less than said first diameter, said first intermediate section has a frusto-conical shape angling outwardly from the junction with said second intermediate section to the junction with said base section at an included angle of about 17 to about 23 degrees, said first intermediate section and said base forming a fillet at the junction thereof whereby said base forms a shoulder with said intermediate section, said insert is fixedly held to said head portion by brazing.

*18. A rotatable cutting bit according to claim 1 wherein said second intermediate section extends forwardly along the longitudinal axis from the junction with said first intermediate section to the tip section a distance of about 0.03 inches.*

*19. A rotatable cutting bit according to claim 8 wherein said second intermediate section extends forwardly along the longitudinal axis from the junction with said first intermediate section to the tip section a distance of about 0.03 inches.*

*20. A rotatable cutting bit according to claim 9 wherein said second intermediate section extends forwardly along the longitudinal axis from the junction with said first intermediate section to the tip section a distance of about 0.03 inches.*

*21. A rotatable cutting bit according to claim 10 wherein said second intermediate section extends forwardly along the longitudinal axis from the junction with said first intermediate section to the tip section a distance of about 0.03 inches.*

*22. A rotatable cutting bit according to claim 11 wherein said second intermediate section extends forwardly along the longitudinal axis from the junction with said first intermediate section to the tip section a distance of about 0.03 inches.*

*23. A rotatable cutting bit according to claim 15 wherein said second intermediate section extends forwardly along the longitudinal axis from the junction with said first intermediate section to the tip section a distance of about 0.03 inches.*

*24. A rotatable cutting bit according to claim 16 wherein said second intermediate section extends forwardly along the longitudinal axis from the junction with said first intermediate section to the tip section a distance of about 0.03 inches.*

*25. A rotatable cutting bit according to claim 17 wherein said second intermediate section extends forwardly along the longitudinal axis from the junction with said first intermediate section to the tip section a distance of about 0.03 inches.*

*26. A rotatable cutting bit according to claim 1 wherein the hard insert having an overall axial length, and the second intermediate section extends forwardly along the longitudinal axis from the junction with the first intermediate section to the tip section a distance that ranges between about 3.4 percent and about 11.4 percent of the overall axial length of the hard insert.*

*27. A rotatable cutting bit according to claim 26 wherein the second intermediate section extends forwardly along the longitudinal axis from the junction with the first intermediate section to the tip section a distance that ranges between about 5 percent and about 9 percent of the overall axial length of the hard insert.*

*28. A rotatable cutting bit according to claim 26 wherein the second intermediate section extends forwardly along the longitudinal axis from the junction with the first intermediate section to the tip section a distance that ranges between about 5.5 percent and about 6.5 percent of the overall axial length of the hard insert.*

*29. A rotatable cutting bit according to claim 8 wherein the hard insert having an overall axial length, and the second intermediate section extends forwardly along the longitudinal axis from the junction with the first intermediate section to the tip section a distance that ranges between about 3.4 percent and about 11.4 percent of the overall axial length of the hard insert.*

*30. A rotatable cutting bit according to claim 29 wherein the second intermediate section extends forwardly along the longitudinal axis from the junction with the first intermediate section to the tip section a distance that ranges between about 5 percent and about 9 percent of the overall axial length of the hard insert.*

*31. A rotatable cutting bit according to claim 29 wherein the second intermediate section extends forwardly along the longitudinal axis from the junction with the first intermediate section to the tip section a distance that ranges between about 5.5 percent and about 6.5 percent of the overall axial length of the hard insert.*

*32. A rotatable cutting bit according to claim 9 wherein the hard insert having an overall axial length, and the second intermediate section extends forwardly along the longitudinal axis from the junction with the first intermediate section to the tip section a distance that ranges between about 3.4 percent and about 11.4 percent of the overall axial length of the hard insert.*

*33. A rotatable cutting bit according to claim 32 wherein the second intermediate section extends forwardly along the*

*longitudinal axis from the junction with the first intermediate section to the tip section a distance that ranges between about 5 percent and about 9 percent of the overall axial length of the hard insert.*

*34. A rotatable cutting bit according to claim 32 wherein the second intermediate section extends forwardly along the longitudinal axis from the junction with the first intermediate section to the tip section a distance that ranges between about 5.5 percent and about 6.5 percent of the overall axial length of the hard insert.*

*35. A rotatable cutting bit according to claim 10 wherein the hard insert having an overall axial length, and the second intermediate section extends forwardly along the longitudinal axis from the junction with the first intermediate section to the tip section a distance that ranges between about 3.4 percent and about 11.4 percent of the overall axial length of the hard insert.*

*36. A rotatable cutting bit according to claim 35 wherein the second intermediate section extends forwardly along the longitudinal axis from the junction with the first intermediate section to the tip section a distance that ranges between about 5 percent and about 9 percent of the overall axial length of the hard insert.*

*37. A rotatable cutting bit according to claim 35 wherein the second intermediate section extends forwardly along the longitudinal axis from the junction with the first intermediate section to the tip section a distance that ranges between about 5.5 percent and about 6.5 percent of the overall axial length of the hard insert.*

*38. A rotatable cutting bit according to claim 11 wherein the hard insert having an overall axial length, and the second intermediate section extends forwardly along the longitudinal axis from the junction with the first intermediate section to the tip section a distance that ranges between about 3.4 percent and about 11.4 percent of the overall axial length of the hard insert.*

*39. A rotatable cutting bit according to claim 38 wherein the second intermediate section extends forwardly along the longitudinal axis from the junction with the first intermediate section to the tip section a distance that ranges between about 5 percent and about 9 percent of the overall axial length of the hard insert.*

*40. A rotatable cutting bit according to claim 38 wherein the second intermediate section extends forwardly along the longitudinal axis from the junction with the first intermediate section to the tip section a distance that ranges between about 5.5 percent and about 6.5 percent of the overall axial length of the hard insert.*

*41. A rotatable cutting bit according to claim 15 wherein the hard insert having an overall axial length, and the second intermediate section extends forwardly along the longitudinal axis from the junction with the first intermediate section to the tip section a distance that ranges between about 3.4 percent and about 11.4 percent of the overall axial length of the hard insert.*

*42. A rotatable cutting bit according to claim 41 wherein the second intermediate section extends forwardly along the longitudinal axis from the junction with the first intermediate section to the tip section a distance that ranges between about 5 percent and about 9 percent of the overall axial length of the hard insert.*

*43. A rotatable cutting bit according to claim 41 wherein the second intermediate section extends forwardly along the longitudinal axis from the junction with the first intermediate section to the tip section a distance that ranges between about 5.5 percent and about 6.5 percent of the overall axial length of the hard insert.*

*44. A rotatable cutting bit according to claim 16 wherein the hard insert having an overall axial length, and the second intermediate section extends forwardly along the longitudinal axis from the junction with the first intermediate section to the tip section a distance that ranges between about 3.4 percent and about 11.4 percent of the overall axial length of the hard insert.*

*45. A rotatable cutting bit according to claim 44 wherein the second intermediate section extends forwardly along the longitudinal axis from the junction with the first intermediate section to the tip section a distance that ranges between about 5 percent and about 9 percent of the overall axial length of the hard insert.*

*46. A rotatable cutting bit according to claim 44 wherein the second intermediate section extends forwardly along the longitudinal axis from the junction with the first intermediate section to the tip section a distance that ranges between about 5.5 percent and about 6.5 percent of the overall axial length of the hard insert.*

*47. A rotatable cutting bit according to claim 17 wherein the hard insert having an overall axial length, and the second intermediate section extends forwardly along the longitudinal axis from the junction with the first intermediate section to the tip section a distance that ranges between about 3.4 percent and about 11.4 percent of the overall axial length of the hard insert.*

*48. A rotatable cutting bit according to claim 47 wherein the second intermediate section extends forwardly along the longitudinal axis from the junction with the first intermediate section to the tip section a distance that ranges between about 5 percent and about 9 percent of the overall axial length of the hard insert.*

*49. A rotatable cutting bit according to claim 47 wherein the second intermediate section extends forwardly along the longitudinal axis from the junction with the first intermediate section to the tip section a distance that ranges between about 5.5 percent and about 6.5 percent of the overall axial length of the hard insert.*

*50. A rotatable cutting bit comprising a head portion, a shank portion depending from said head portion along a longitudinal axis, said head portion having a socket at the forward end, a hard insert having coaxially aligned and integral sections, said sections comprising a base section, a tip section, a first intermediate section contiguous with said base, a second intermediate section of uniform diameter contiguous with said first intermediate and tip sections, said second intermediate section extends forwardly along the longitudinal axis from the junction with said first intermediate section to the tip section a fifth distance, said base being fixedly mounted in said socket and having a first diameter, said tip section being conically shaped and having a maximum second diameter, said first intermediate section having a maximum third diameter, said second intermediate section having a fourth diameter equal to said maximum second diameter, said second and third diameters each being less than said first diameter, said first intermediate section has a frusto-conical shape and angles outwardly from the junction with said second intermediate section to the junction with said base section, said first intermediate section at said base forming a fillet at the junction thereof whereby said base forms a shoulder with said first intermediate section, said insert is fixedly held to said head portion by brazing, and the ratio of the fifth distance to the first diameter ranging between about 0.03 and about 0.10.*

*51. The rotatable cutting bit according to claim 50 wherein the ratio of the fifth distance to the first diameter equals about 0.05.*

*52. A rotatable cutting bit comprising a head portion, a shank portion depending from said head portion along a longitudinal axis, said head portion having a socket at the forward end, a hard insert having coaxially aligned and integral sections, the hard insert having an overall axial length equal to a sixth distance, said sections comprising a base section, a tip section, a first intermediate section contiguous with said base, a second intermediate section of uniform diameter contiguous with said first intermediate and tip sections, said second intermediate section extends forwardly along the longitudinal axis from the junction with said first intermediate section to the tip section a fifth distance, said base being fixedly mounted in said socket and having a first diameter, said tip section being conically shaped and having a maximum second diameter, said first intermediate section having a maximum third diameter, said second intermediate section having a fourth diameter equal to said maximum second diameter, said second and third diameters each being less than said first diameter, said first intermediate section has a frusto-conical shape and angles outwardly from the junction with said second intermediate section to the junction with said base section, said first intermediate section at said base forming a fillet at the junction thereof whereby said base forms a shoulder with said first intermediate section, said insert is fixedly held to said head portion by brazing, and the ratio of the fifth distance to the sixth distance ranging between about 0.03 and about 0.12.*

*53. The rotatable cutting bit according to claim 52 wherein the ratio of the fifth distance to the sixth distance ranges between about 0.05 and about 0.07.*

*54. A rotatable cutting bit comprising a head portion, a shank portion depending from said head portion along a longitudinal axis, said head portion having a socket at the forward end, a hard insert having coaxially aligned and integral sections, the hard insert having an overall axial length equal to a sixth distance, said sections comprising a base section, a tip section, a first intermediate section contiguous with said base, a second intermediate section of uniform diameter contiguous with said first intermediate and tip sections, said second intermediate section extends forwardly along the longitudinal axis from the junction with said first intermediate section to the tip section a fifth distance, said base being fixedly mounted in said socket and having a first diameter, said tip section being conically shaped and having a maximum second diameter, said first intermediate section having a maximum third diameter, said second intermediate section having a fourth diameter equal to said maximum second diameter, said second and third diameters each being less than said first diameter, said first intermediate section has a frusto-conical shape and angles outwardly from the junction with said second intermediate section to the junction with said base section, said first intermediate section at said base forming a fillet at the junction thereof whereby said base forms a shoulder with said first intermediate section, said insert is fixedly held to said head portion by brazing, and the ratio of the fifth distance to the first diameter ranging between about 0.03 and about 0.10, and the ratio of the fifth distance to the sixth distance ranges between about 0.03 and about 0.12.*

*55. The rotatable cutting bit according to claim 54 wherein the ratio of the fifth distance to the sixth distance ranges between about 0.05 and about 0.07.*

*56. The rotatable cutting bit according to claim 54 wherein the ratio of the fifth distance to the first diameter equals about 0.05.*

*57. The rotatable cutting bit according to claim 56 wherein the ratio of the fifth distance to the sixth distance ranges between about 0.05 and about 0.07.*

* * * * *